US006179319B1

United States Patent
Malisch et al.

(10) Patent No.: US 6,179,319 B1
(45) Date of Patent: Jan. 30, 2001

(54) TRACTOR-TRAILER

(75) Inventors: Roman Malisch, Neubiberg; Alois Knopf, Ottobrunn; Udo Szczepanek, Eichenau; Gottfried Ogris, Unterschleissheim, all of (DE)

(73) Assignee: Rockinger Spezialfabrik für Anhangerkupplungen GmbH & Co., Munich (DE)

( * ) Notice: Under 35 U.S.C. 154(b), the term of this patent shall be extended for 0 days.

(21) Appl. No.: 09/387,549

(22) Filed: Aug. 31, 1999

(30) Foreign Application Priority Data

Sep. 2, 1998  (DE) .............................................. 198 40 007

(51) Int. Cl.[7] ....................................................... B60D 1/01
(52) U.S. Cl. ........................... 280/477; 280/407; 280/420
(58) Field of Search ................................... 280/477, 407, 280/407.1, 420, 421, 422

(56) References Cited

U.S. PATENT DOCUMENTS 3,391,950 * 7/1968 Carter et al. ........................ 280/421
3,888,513 * 6/1975 Pilz et al. ............................ 280/421
5,480,042 * 1/1996 Engle .................................... 213/1.3
5,516,136 * 5/1996 Matthews et al. .................... 280/422

FOREIGN PATENT DOCUMENTS

0539675 B1    5/1993  (EP) .

* cited by examiner

Primary Examiner—Brian L. Johnson
Assistant Examiner—Tony Winner
(74) Attorney, Agent, or Firm—Baker Botts L.L.P.

(57) ABSTRACT

A tractor-trailer (10) comprises a tractor (12) and a trailer (14), a trailer coupling (12b) and a supply coupling (16/18) between the two component vehicles (12, 14) with a tractor-side coupling half (16) and a trailer-side coupling half (18), which can be coupled together by bringing them together along a predefined coupling axis (K). One of the coupling halves (16) is connected to the supply unit of the associated first component vehicle (12) through a flexible supply line (16d). To establish the coupled state between the two coupling halves (16, 18), an actuator (20) is arranged on the first component vehicle (12) that moves the first coupling half (16) toward the second coupling half (18) and joins the one to the other along the predefined coupling axis (K). The first coupling half (16) is arranged on the actuator (20) such that it can be oriented in all spatial directions at least within predetermined limits.

54 Claims, 4 Drawing Sheets

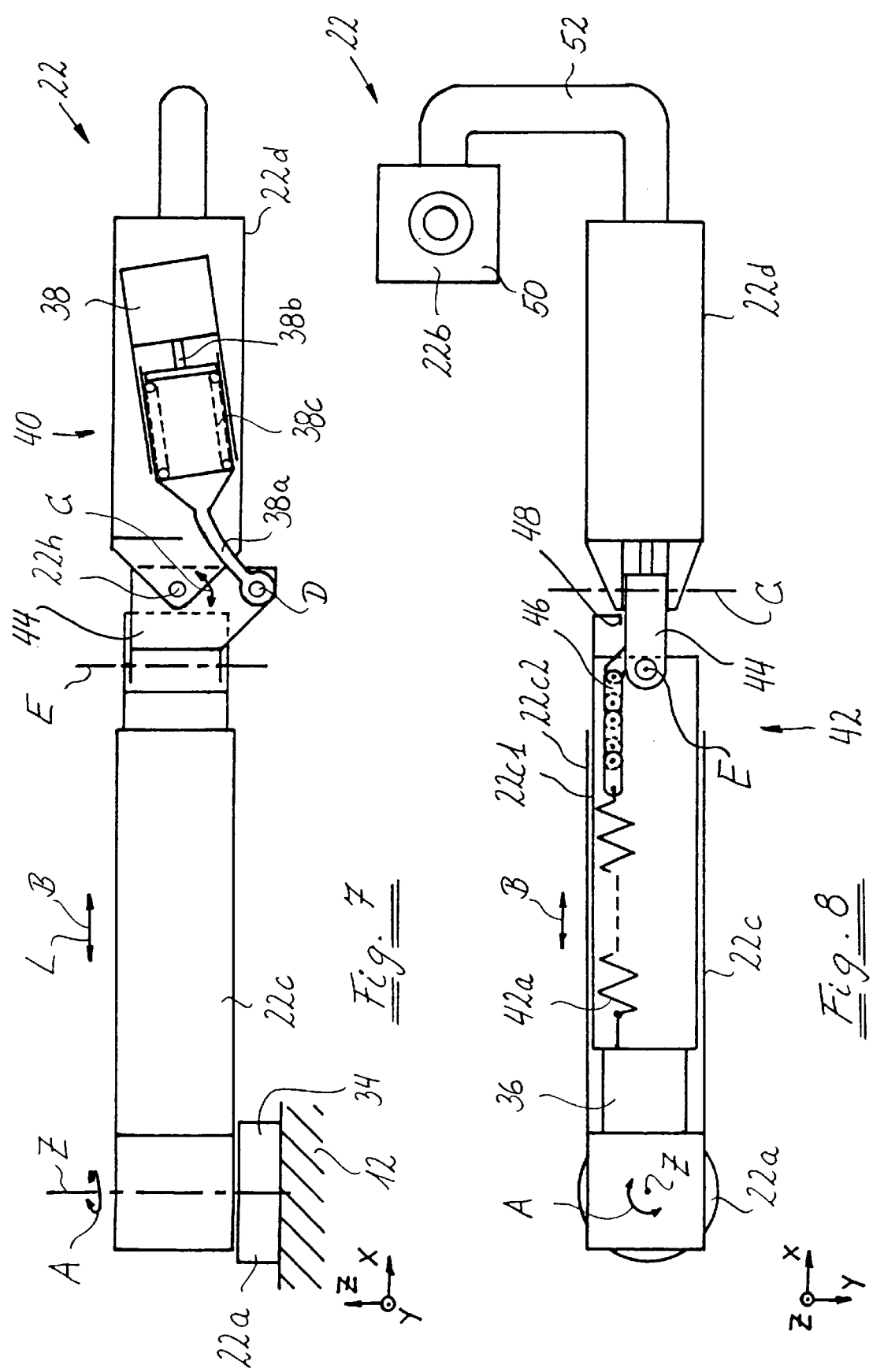

TRACTOR-TRAILER

BACKGROUND OF THE INVENTION

The invention relates to a tractor-trailer with two component vehicles, specifically a tractor and a trailer, with a trailer coupling to create an articulated push/pull connection between the two component vehicles and with a supply coupling between the two component vehicles, wherein the supply coupling comprises a tractor-side coupling half (hereinafter sometimes called "tractor coupling half") and a trailer-side coupling half (hereinafter sometimes called "trailer coupling half"), which can be coupled together by bringing them together along a predefined coupling axis, wherein one of the coupling halves is connected to the supply unit of the associated first component vehicle through a flexible supply line, and when coupled to the other coupling half is movable relative to the first component vehicle in such a way that relative motions of the two component vehicles are essentially unhindered.

A supply coupling here is understood to mean a coupling between two sections of a line that is intended and suitable for supplying the trailer, from a supply unit in the tractor, with electric current and/or control commands and/or compressed air and/or hydraulic fluid for a wide variety of functions such as lighting, braking, dump body actuation and the like. It is certainly possible in this context to provide a plurality of supply lines and a corresponding number of supply couplings for the various feeds. However, for reasons of simplified handling, it is preferred to combine as many supply lines as possible in one cable harness or hose harness in order to make all necessary supply lines functional by connecting a single or a few supply couplings.

In conventional tractor-trailer rigs, the supply couplings are connected by hand. To do so, it is necessary for the operator to move from the driver's seat to the region of the front wall of the trailer and connect the two coupling halves there.

EP 0 539 675 A1 discloses a tractor-trailer in which the supply coupling is designed and arranged such that the two coupling halves are forced to engage with one another when the tractor approaches the trailer in order to establish the push/pull connection between the two component vehicles. To this end, the tractor coupling half on the tractor is held in a mount in a capture-ready position. Attached to the trailer is a toothed rack which engages with the tractor coupling half when the tractor approaches the trailer, i.e., catches the coupling half and extracts it from the mount. The tractor coupling half is subsequently moved along the toothed rack to the trailer coupling half and coupled thereto by means of a motor.

In the tractor-trailer known from EP 0 539 675 A1, the tractor must approach the trailer with a predetermined relative orientation thereto that is within quite tight limits in order to ensure proper capture of the tractor coupling half by the toothed rack. In particular, the tractor and trailer must have zero or only a very small relative tilt about the lateral axis, such as can occur when the trailer stands on a level stretch but the tractor is located on a rising or descending ramp. With the known tractor-trailer, it can occur in this case that the tractor coupling half is not properly captured by the toothed rack and falls down.

BRIEF SUMMARY OF THE INVENTION

An object of the invention is to specify a tractor-trailer of the type described at the outset wherein reliable joining of the tractor and trailer coupling halves is ensured while at the same time allowing great freedom in terms of permissible relative orientations of tractor and trailer.

The foregoing object is attained in accordance with the invention by a tractor-trailer of the type described at the outset in which an actuator is arranged on one component vehicle that moves one coupling half toward the other coupling half and joins the one to the other by along the predefined coupling axis and in which the one coupling half is arranged on the actuator such that it can be oriented in all directions at least within predetermined limits.

In accordance with the invention, the actuator arranged on one component vehicle carries the one coupling half at least until the coupled state is established between the two coupling halves. Thus it is not necessary to transfer one coupling half from a device arranged on one component vehicle to a device arranged on the other component vehicle, or to have the coupling half captured thereby, prior to the engagement of one coupling half with the other coupling half. Since such a transfer of one coupling half is avoided in the tractor-trailer according to the invention, there is no risk of one coupling half being dropped. Moreover, as already mentioned above, the actuator does not release the coupling half until the coupled state is established between the two coupling halves, so a reliable joining of the two coupling halves is assured.

Furthermore, due to the use of the actuator, joining of the two coupling halves does not place high demands on the relative orientation of the two component vehicles. As a result, when the two coupling halves are to be connected together, the tractor and the trailer can have any orientation relative to one another within generous limits. Since the actuator must move one coupling half to the coupling axis defined by the position of the other coupling half and position it there, then orient the first coupling half in the direction of this coupling axis, and finally advance this coupling half along the coupling axis to the second coupling half, the practical limits for the permissible relative orientation of the two component vehicles can be viewed as nothing more than a compromise between the relative orientations of the two component vehicles that occur in actual practice on the one hand, and on the other hand the economically feasible cost of constructing the actuator.

Since the precise relative orientation of the two component vehicles is not known at the start of the coupling process, and it is furthermore not known where and in which orientation the second coupling half is mounted on the other component vehicle, in order to facilitate positioning of the first coupling half on the coupling axis and also to facilitate orientation of the first coupling half toward the second coupling half, it is proposed that positioning and orientation aids be affixed to the other component vehicle. These positioning and orientation aids can be composed of markings on the other component vehicle, for instance, which can be detected by sensor units arranged on the first component vehicle, preferably on the actuator.

According to the invention, it is proposed, however, that the positioning and orientation aids comprise two stop faces running at right angles to the predefined coupling axis and preferably also to one another, and that mating stops which work together with the stop faces be provided on the first coupling half or on a part which can be attached thereto. This design for the positioning and orientation aids permits considerable simplification in the construction of the actuator.

It is of course possible to equip all five of the actuator's axes of motion, which constitute the minimum necessary for positioning the first coupling half on the coupling axis defined by the second coupling half and for orienting the first coupling half toward this coupling axis and advancing the first coupling half toward the second coupling half along this axis, with actuating drives, for example electric, hydraulic, pneumatic, hydropneumatic, or other suitably constructed actuating drives. Of course, the actuator can also have more than five axes of motion.

However, when the positioning and orientation aids are provided and are equipped with two stop faces at right angles to the predefined coupling axis and preferably to one another as well, it is sufficient for example to have three such actuating drives which permit translational motion of the first coupling half in three dimensions, hence to position the first coupling half on the coupling axis and advance it toward the second coupling half along the coupling axis. The correct orientation of the first coupling half in the direction of the coupling axis, i.e., the accommodation of the remaining axes of motion, for example two, is accomplished indirectly under the influence of the translational movement of the first coupling half by means of the interaction of the stop faces with the mating stops arranged on the first coupling half; this means that no separate motorized actuating drives are needed for that purpose.

Furthermore, the interaction of the stop faces with the mating stops on the first coupling half makes it easier to locate the coupling axis and/or to maintain it while advancing toward the second coupling half.

The stop faces can, for example, be comprised of the preferably mutually perpendicular surfaces of an extruded profile, as for example a metal angle.

In order to at least make it more difficult to remove the first coupling half from the coupling axis in at least one direction after it is positioned on the coupling axis, it is proposed in a further development of the invention to provide appropriate securing means, for example in the form of a retaining surface. This retaining surface can for example take the form of a sheet metal strip which originates at one of the profile sections of the extruded profile and preferably extends essentially parallel to the other profile section of the extruded profile. In combination with the stop faces, the securing means thus constitute a guide rail for the first coupling half or a part attached thereto.

In order to be able to ensure exact relative positioning of the two coupling halves shortly before they engage, thus preventing damage to the plug contacts, it is further proposed that additional securing means be provided in an approach area directly in front of the second coupling half; said securing means only permit the first coupling half to move in the direction of the coupling axis, for example by acting in conjunction with the first securing means. The second securing means can take the form of another sheet metal strip which originates at the other profile section of the extruded profile, preferably a metal angle whose free side extends toward the first sheet metal strip. In addition, a guide angle can be formed or located on the end of the second sheet metal strip furthest from the second coupling half.

The actuator can be embodied in a variety of forms. For example, a Y-Z table can be arranged on the rear wall of the driver's cab that permits adjustment in the directions of the lateral axis Y and the vertical axis Z of the tractor as well as adjustment by a telescoping arm whose length can be changed by extension and retraction generally in the tractor's longitudinal direction X. In accordance with the invention, however, it is proposed that the actuator is comprised of a robot arm articulated from the first component vehicle and having at least two arm sections that are capable of rotation relative to one another, where the first coupling half can be arranged on the free end of the robot arm. This has the advantage that when the robot arm is not being used to set up or break down the coupled state of the two coupling halves, it can be folded into a parked position on the first component vehicle, saving space and thus not interfering with relative motion of the two component vehicles.

For example, the robot arm can be attached to the first component vehicle such that it can rotate about its vertical axis, and an actuating drive is preferably dedicated to this adjustment option. Moreover, at least two arm sections of the robot arm can rotate relative to one another about an axis essentially perpendicular to the first component vehicle's vertical axis, and an actuating drive is preferably assigned to this adjustment option. Lastly, the robot arm can have at least one adjustable-length arm section wherein the direction of extension is preferably essentially perpendicular to the vertical axis of the first component vehicle as well as to the axis of relative rotation of the two arm sections, and an actuating drive is preferably assigned to this adjustment option. It must be emphasized that the three adjustment options described above merely represent one possible embodiment for facilitating translational motion of the free robot arm while simultaneously providing a parked position for the robot arm.

Particularly when the first coupling half or a part associated therewith which can be freely oriented on the free end of the robot arm works together with stop faces of positioning and orientation aids, it is advantageous for the robot arm to include at least one preloading device which preloads the free end of the robot arm in the two directions perpendicular to the coupling axis, in particular toward the two stop faces. The at least one preloading device simplifies control of the movement of the free end of the robot arm, for example to advance the first coupling half toward the second coupling half along the coupling axis, since the mating stops of the first coupling half are always held in contact with the associated stop faces as a result of the preloading even when control of the positioning device is not very precise, so that the first coupling half not only remains precisely positioned on the coupling axis, but also remains precisely oriented in the direction of the coupling axis. Moreover, in the case of imprecise control the cushioning action provided by the at least one preloading device protects the robot arm from deformational damage caused by excessively strong interaction with the stop faces.

A preloading device can for example be formed by providing an additional swivel joint between at least two arm sections in addition to the swivel joint whose swivel axis runs perpendicular to the vertical axis; the first pivoting part of the additional swivel joint is preloaded against a stop on the other pivoting part. Another possibility for forming a preloading device is for at least one actuating drive to include a spring arrangement between a driven element connected to the drive unit of the actuating drive and an output element that is adjustable relative to the driven element.

It is certainly possible to arrange the first coupling half so that it is permanently connected to the free end of the robot arm and to switch off the drive to the robot arm and thus make it freely movable after the coupled state has been established between the two coupling halves, so that the robot arm does not hinder relative motion of the two component vehicles in tractor-trailer operation. However, in this case the robot arm would have to be designed such that it is not in danger of being damaged in even the most extreme relative positions of the two component vehicles. To be able to reliably prevent damage to the robot arm, it is thus proposed in accordance with the invention to arrange a gripper device at the free end of the robot arm, preferably such that it can be oriented in all spatial directions at least within predefined limits, where the first coupling half can be detachably arranged on the robot arm by means of said gripper device. This makes it possible to detach the robot arm from the first coupling half after the coupled state has been established between the two coupling halves and to fold it up against the first component vehicle for subsequent tractor-trailer operation. Such a folding can also be advantageous when the first coupling half is held on the robot arm by means of the gripper device, specifically when arranging the robot arm on the tractor during transfers from one trailer to another. It is thus further proposed that a parking device be provided for the actuator and if necessary the first coupling half.

The gripper device can, for example, include a receptacle for the first coupling half as well as an adjustable gripper claw that can be brought into engagement with a gripping recess in the first coupling half in order to hold it.

To be able to advance the gripper device toward the two coupling halves by means of the robot arm to uncouple them, and in particular toward the first coupling half, in the same manner as described above for the case of creating the coupled state of the two coupling halves, it is proposed that a mating stop device be arranged on the gripper device that is intended to work together with a stop device of the positioning and orientation aid. This mating stop device can for example be comprised of a frame with at least three stop points, and also a number of rollers rotatably mounted on the frame if desired.

When the mating stop device advances toward the stop device, which preferably includes mutually perpendicular surfaces, the mating stop device, with its at least three stop points which define a plane, initially engages one of the two stop faces of the stop device. If the mating stop device is subsequently moved along the stop face to the second stop face, engagement of this second stop face with two of the mating stop device's stop points is sufficient to exactly position and orient the gripper device relative to the coupling axis.

In order to be able to provide the gripper device's essentially free orientability in all spatial directions at the free end of the robot arm with a simple and robust design, it is proposed that a pin be fastened to the gripper device that passes with clearance through an opening provided in the free end of the robot arm, where the pin is preferably surrounded by a helical and/or coil spring that bears against the gripper device on one end and the robot arm on the other. Naturally, free movability could also be achieved by mounting the gripper device on the free end of the robot arm with a ball-and-socket or gimbal mount.

Since experience shows that parts arranged on the tractor are treated more carefully in rough everyday use than those arranged on the trailer, because tractors are practically never lent among shipping firms in contrast to trailers, it is proposed that the positioning and orientation aids be arranged on the trailer, that the second coupling half be rigidly mounted on the trailer, and that the first coupling half be connected to the tractor's supply unit through a flexible supply line.

DESCRIPTION OF THE DRAWINGS

For a more complete understanding of the present invention, and the advantages thereof, reference may be made to the following written description of an exemplary embodiment, taken in conjunction with the accompanying drawings.

FIGS. 7 and 8 are detailed illustrations of the robot arm from FIG. 4 in side view (FIG. 7) and top view (FIG. 8);

DESCRIPTION OF THE EMBODIMENT

Figure 1:
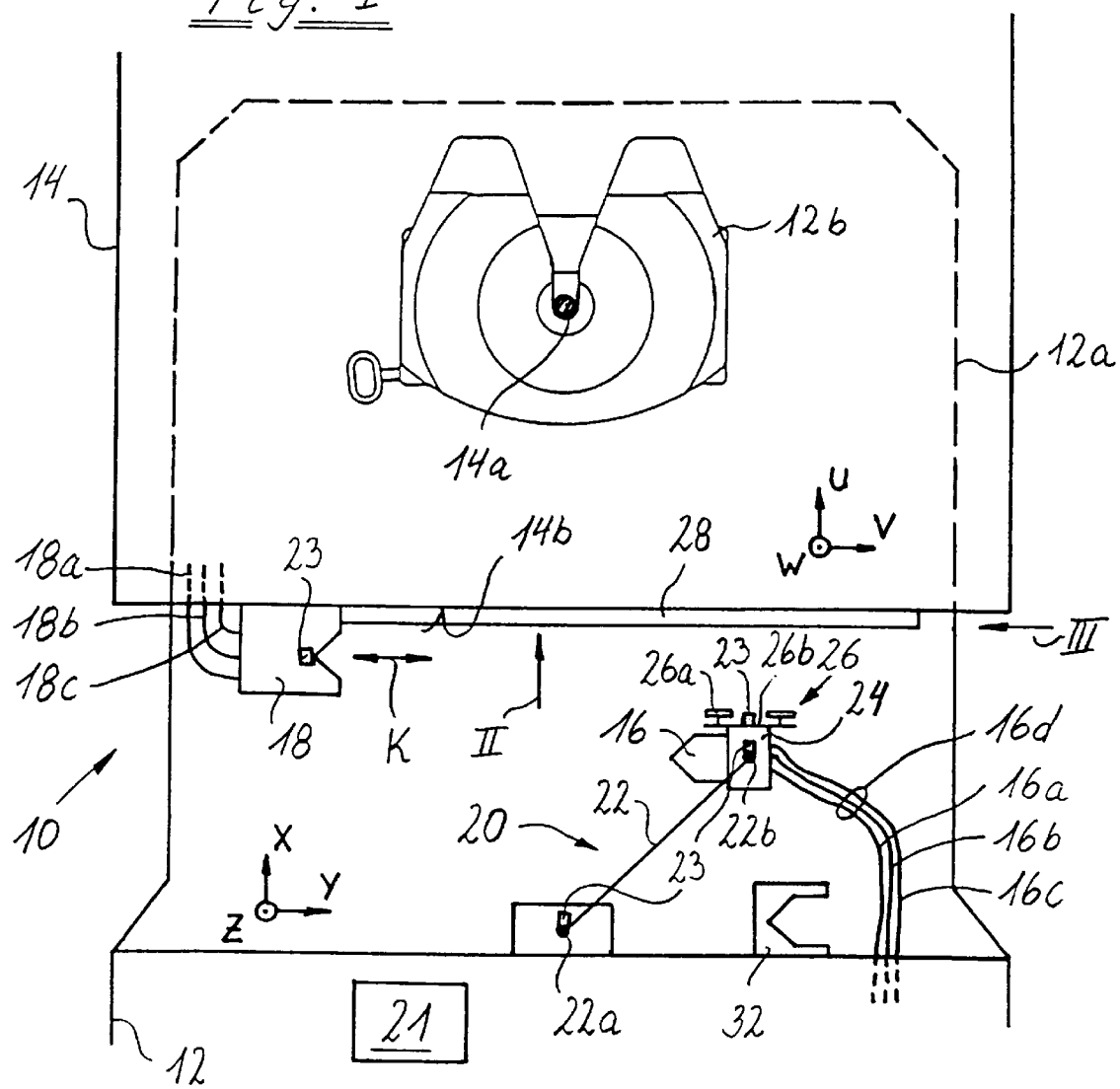
FIG. 1 is a top view of a tractor-trailer in accordance with the invention.

In FIG. 1, a tractor-trailer unit as an example for a tractor-trailer according to the invention is labeled 10 overall. However it must be emphasized here that the invention can be used equally advantageously in an articulated vehicle equipped with a pin coupling, and that the explanation using the tractor-trailer unit 10 must be considered merely a non-limiting example.

The tractor-trailer unit 10 includes a truck tractor 12, i.e., a tractor of the tractor-trailer unit 10, and a semitrailer 14, i.e., a trailer of the tractor-trailer unit 10. A conventional fifth wheel plate 12b is attached to the frame 12a of the truck tractor 12. Together with the king pin 14a of the semitrailer 14, the fifth wheel plate 12b forms a fifth wheel coupling.

To simplify the description below, the tractor 12 is labeled with a coordinate system XYZ with a tractor-side (hereinafter abbreviated as tractor) longitudinal axis X, a tractor lateral axis Y, and a tractor vertical axis Z. In addition, the semitrailer 14 is labeled with the coordinate system UVW, with a trailer-side (hereinafter abbreviated as trailer) longitudinal axis U, a trailer lateral axis V, and a trailer vertical axis W.

In addition, a tractor coupling half 16 and a trailer coupling half 18 are provided, which together form a supply coupling between the two component vehicles 12 and 14 and are connected to tractor supply lines 16a, 16b, 16c, ... and trailer supply lines 18a, 18b, 18c, ... . The trailer coupling half 18 is fixed to a front load wall 14b of the trailer, while the tractor coupling half 16 is arranged to be movable relative to the tractor 12 by means of an actuator labeled overall as 20 in FIG. 1. The tractor supply lines 16a, 16b, 16c ... are therefore combined into a flexible supply line harness 16d.

The tractor and trailer supply lines 16a, 16b, 16c, and 18a, 18b, 18c, ... can be, for example, power supply lines, compressed air supply lines, hydraulic fluid supply lines, signal lines of a bus system responsible for the brake function, signal lines for a bus system responsible for the other functions of the trailer ("frame bus"), and other similar lines.

The actuator 20 comprises a robot arm 22 only roughly schematically represented in FIG. 1 as a line, which is attached at 22a such that it can rotate about an axis parallel to the vertical axis Z of the tractor 12. By means of the robot arm 22, the tractor coupling half 16 can be advanced to the trailer coupling half 18 and moved along a coupling axis K defined by its orientation to establish a coupled state of the supply coupling. The coupling axis K on the trailer can of course be oriented in any direction. However, it is preferred for said axis to run essentially parallel to the lateral axis V of the trailer 14.

Figure 9:
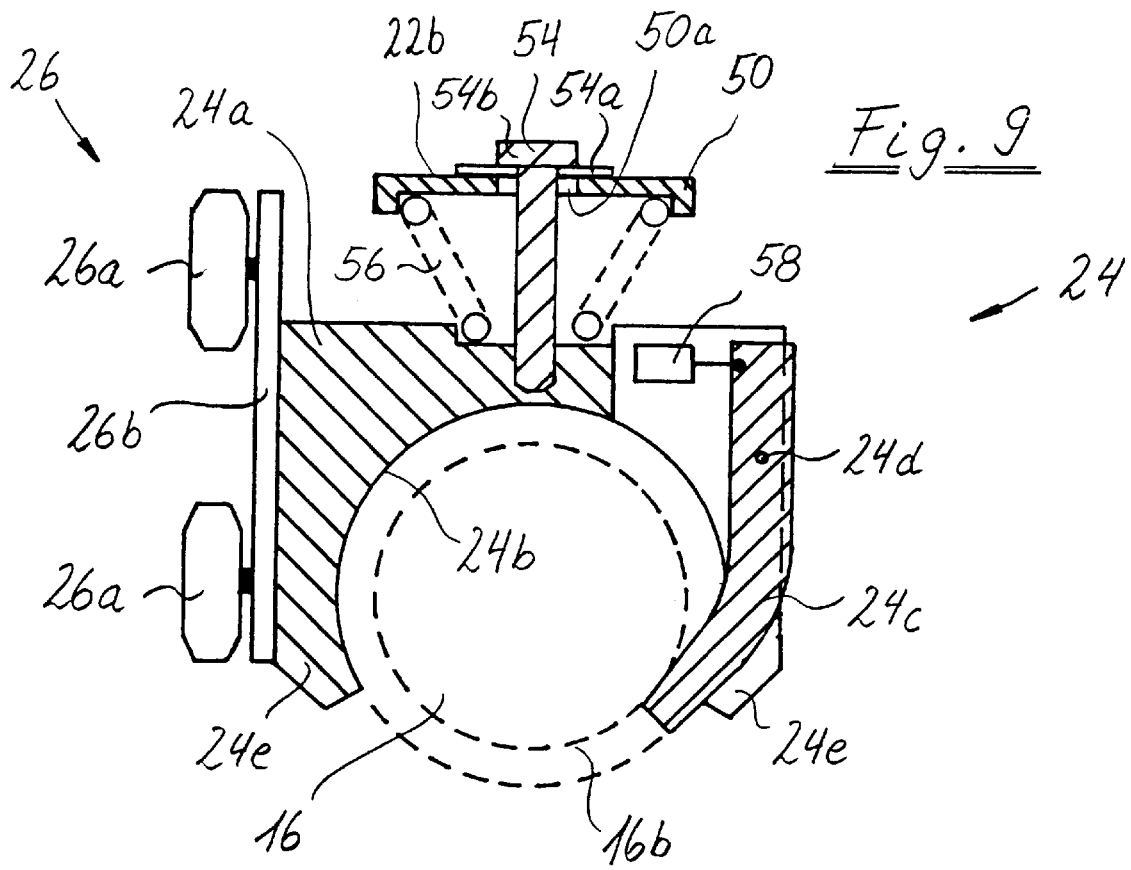
FIG. 9 is a schematic view of a gripper device.

Attached to the free end 22b of the robot arm 22 is a gripper device 24, which can be swiveled freely relative to the robot arm in all spatial directions at least within predefined limits, and thus can be oriented as desired, as will be explained in greater detail below with reference to FIG. 9. The gripper device 24 serves to hold the tractor coupling half 16 such that it can be released. In addition, a stop device 26 with a frame plate 26b and a plurality of rollers 26a arranged thereupon is provided on the gripper device 24 (see also FIG. 9). The stop device 26 works together with a mating stop device 28 on the trailer 14 to position the tractor coupling half 16 on the coupling axis K and orient the tractor coupling half 16 in the direction of the coupling axis K.

The mating stop device 28 comprises an extruded profile 30 with a first profile section 30a, which runs essentially parallel to the vertical axis W and to the lateral axis V of the trailer 14, and with a second profile section 30b, which runs essentially parallel to the longitudinal axis U and to the lateral axis V of the trailer 14.

The tractor stop device 26 and the trailer mating device 28 are designed and arranged such that, when the tractor stop device 26 engages with both the stop face 30a and the stop face 30b, the tractor coupling half 16 is exactly positioned on the coupling axis K and exactly oriented in the direction of the coupling axis K facing the trailer coupling half 18.

An example of a way to proceed to establish the coupled state of the two coupling halves 16 and 18 is as follows:

The starting point is a state in which the tractor 12 is already coupled with the trailer 14 by insertion of the king pin 14a into the receiving slot of the fifth wheel coupling 12b. In this state, which lacks only establishment of the coupled state of the two supply coupling halves 16 and 18 to be ready for driving in tractor-trailer operation, the tractor 12 and the trailer 14 can have any orientation relative to one another within generous limits. For example, the longitudinal axes X and U of the two component vehicles 12 and 14 can enclose an angle α, defined by rotation about the vertical axis Z or W, which is not vanishingly small and can also enclose an angle β, defined by rotation about the lateral axes Y and V, which is not vanishingly small. As long as the measurements of the angles α and β lie within predetermined limits, which can be chosen to be very generous and are limited solely by the compromise between costly construction and economic feasibility (for example: $-10°\leq\alpha\leq10°$; $-7°\leq\beta\leq7°$), the coupled state can be established between the two coupling halves 16 and 18 with the aid of the actuator 20 according to the invention.

To this end, the gripper device 24 with the tractor coupling half 16 held thereupon by means of the robot arm 22 is released from a parking device 32; said parking device is mounted on the tractor 12, and provides support and thus protection against damage for the coupling half 16, the robot arm 22 and the gripper device 24 when the tractor is driven without a trailer. The gripper device 24 is then moved toward the stop plate 30 until the rollers 26a engage the stop face 30a. When all rollers 26a rest with their end faces against the stop face 30a, the gripper device 24 and thus also the tractor coupling half 16 are already correctly oriented with respect to tilt about the trailer vertical axis W and the trailer lateral axis V. From this point on, the gripper device 24 is moved up by the robot arm, i.e., essentially in the direction of the trailer vertical axis W, until the uppermost roller 26a engages the stop face 30b. This engagement also ensures correct orientation with respect to rotation of the gripper device 24 and tractor coupling half 16 about the trailer axis U. Moreover, the extruded profile 30 and the stop device 26 are arranged and sized such that the tractor coupling half 16 is exactly positioned on the coupling axis K and exactly oriented in the direction thereof when the rollers 26a fully engage the stop face 30a and also the stop face 30b. Lastly, the gripper device 24 is moved by the robot arm 22 further in the direction of the trailer lateral axis V while maintaining the engagement of the rollers 26a with the stop faces 30a and 30b until the coupling halves 16 and 18 are joined together.

It must be emphasized that only three of the five axes of motion necessary for positioning the tractor coupling half 16 on the coupling axis K and for orienting the tractor coupling half 16 toward the coupling axis K and advancing the tractor coupling half 16 toward the trailer coupling half 18 along coupling axis K, are controlled through separate actuating drives using the actuator 20 in accordance with the invention. To be specific, these are the axes of motion responsible for translational motion of the tractor coupling half 16 in space. The two remaining axes of motion, responsible for orienting the tractor coupling half 16, are indirectly controlled by the aforementioned translational motion capabilities in cooperation with the stop device 26 and the mating stop device 30.

An operator can observe, and remotely control by hand, the aforementioned establishment of the coupled state of the two coupling halves 16 and 18. Advantageously, and preferably in conjunction with an automatic, remotely operated fifth wheel coupling, the joining of the two coupling halves 16 and 18 is accomplished automatically under program control following closure of the fifth wheel coupling 12b. It is self-evident that a plurality of sensors 23, such as proximity switches and angle measurement sensors must be provided to measure specific intermediate positions assumed by the gripper device 24 and the tractor coupling half 16 in the course of the above-described motion; the measurement signals from said sensors are delivered to a control unit 21 through signal lines (not shown) or by means of radio, infrared, or similar connecting means. From the measurement signals it receives, the control unit 21 derives information which can trigger initiation of the next movement phase or permit conclusions to be drawn regarding the current orientation of the gripper device 24 and the tractor coupling 16 for use in control of the robot arm 22.

After the coupled state has been established between the two coupling halves 16 and 18, the gripper device 24 is detached from the tractor coupling half 16 and moved back to the parking device 32, where it remains during normal driving operation of the tractor-trailer 10.

Prior to uncoupling of the trailer 14 from the tractor 12, the gripper device 24 is moved from the parking device 32 to the trailer coupling half 18 in the manner described above (this time without the tractor coupling half 16, however) where it grips the tractor coupling half 16, releases the coupled state of the two coupling halves 16 and 18, and then returns to the parking device 32 with the tractor coupling half.

Figures 2, 3:
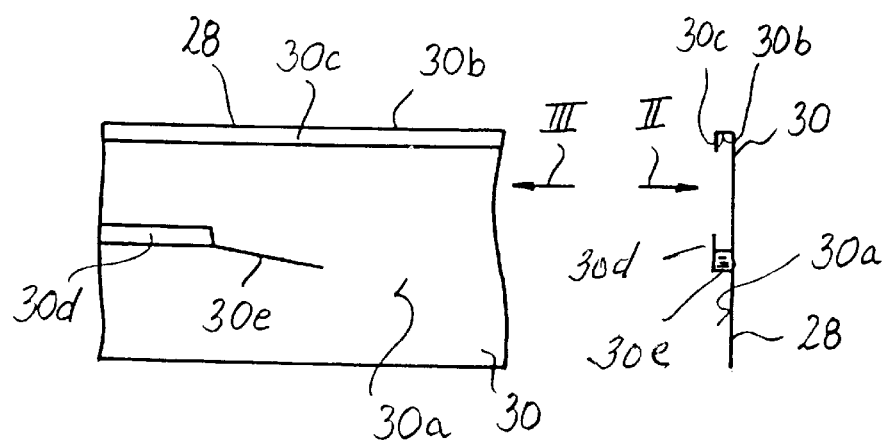
FIG. 2 is a detail of the positioning and orientation aid rail viewed in the direction of arrow II of FIG. 1.
FIG. 3 is a side view of the positioning and orientation aid rail viewed in the direction of arrow III of FIG. 1.

It must be added that the extruded profile 30 also includes a sheet metal strip 30c as in FIGS. 2 and 3, which extends downward from the free end of the profile section 30b and together with it and part of the profile section 30a forms a rail in which can accommodate at least some of the rollers 26a. This rail at least makes it more difficult for the stop device 26 to disengage from the mating stop device again.

As shown in FIG. 2, an additional rail 30d can be provided in an approach area immediately in front of the trailer coupling half 18, which rail serves to accommodate some of the rollers 26a, and prevents unintentional loss of engagement between the two stop devices 26 and 30. Furthermore, a guide angle 30e for the rollers 26a can also be provided in front of the rail 30d.

Figure 4:
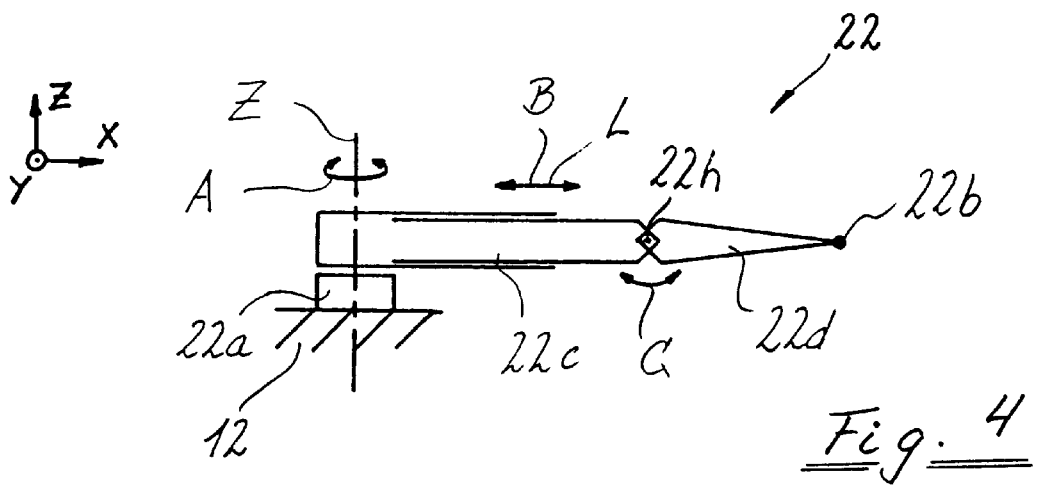
FIGS. 4 through 6 are schematic illustrations of various actuators in side view (FIGS. 4 and 5) and top view (FIG. 6)
Figure 5:
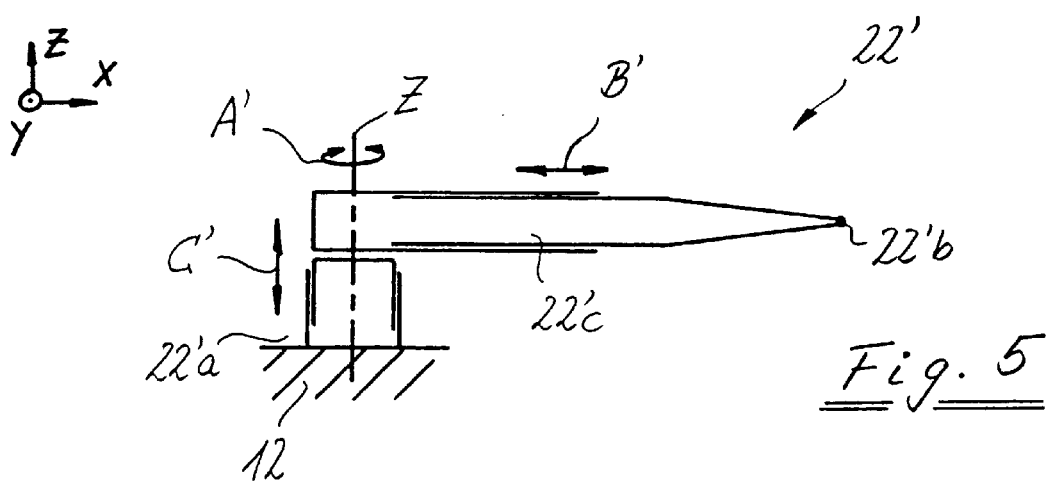
Figure 6:
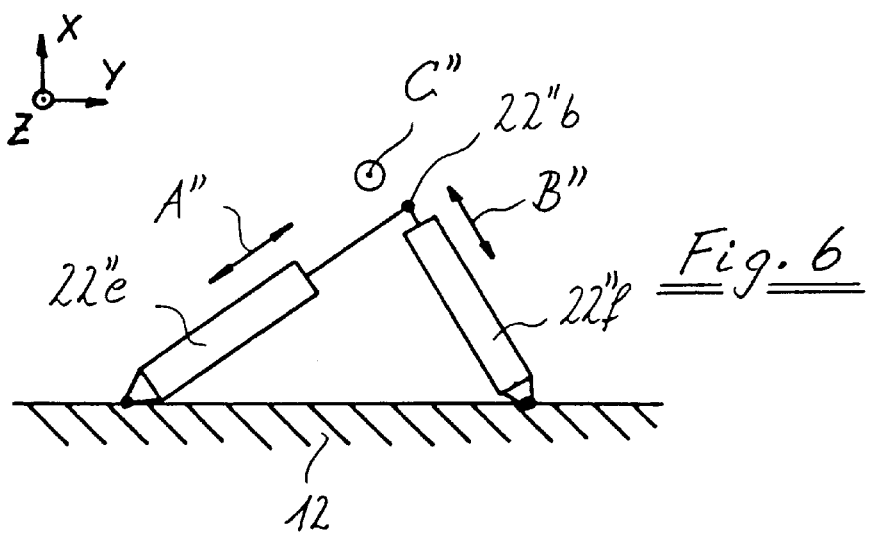

Shown roughly schematically in FIGS. 4 through 6 are three different design options for the robot arm 22 of the XYZ actuator, which accomplishes translational motion of the gripper device 24 in space.

In FIG. 4, the robot arm comprises two arm sections 22c and 22d. The arm section 22c is attached to the tractor 12 at 22a such that it can rotate about the tractor's vertical axis Z. Dedicated to this adjustment option A is, for example, an electric drive motor. In addition, the arm section 22c is designed to be adjustable in length. Dedicated to this adjustment option B, again, is an electric drive motor, for example a spindle drive. The extension direction L associated with adjustment option B runs essentially perpendicular to the vertical axis Z of the tractor 12. Lastly, the second arm section 22b is attached to the first arm section 22c such that it can rotate, where the swivel axis 22h of this adjustment option C runs essentially perpendicular to both swivel axis Z of adjustment option A and extension direction L of adjustment option B. Adjustment option C also has a motor drive dedicated to it.

An embodiment of the robot arm 22 that is more detailed in its design is described more extensively further below using FIGS. 7 and 8.

In the embodiment shown in FIG. 5, the robot arm 22' has only one arm section 22'c, which is mounted at 22'a so it can pivot about the vertical axis Z of the tractor 12 (adjustment option A) and is also movable in the direction of the vertical axis Z (adjustment option C'). In addition, the arm section 22'c is designed to be adjustable in length (adjustment option B').

In the embodiment shown in FIG. 6, the free end 22"b is movable in the direction of the longitudinal axis X and the lateral axis Y of the tractor 12 (adjustment options A" and B") by means of two adjustable-length actuators 22"e and 22"f that are mounted on the tractor 12 such that they can swivel. Movement of the free end 22"B in the direction of the vertical axis Z can be made possible, for example through adjustable-height articulation of the actuating units 22"e and 22"f to the tractor 12 (adjustment option C") .

In FIGS. 7 and 8, the robot arm 22 in the embodiment of FIG. 4 is shown in greater detail. The robot arm 22 is attached to the tractor 12 at 22a such that it can pivot about the vertical axis Z. The pivoting motion is controlled by means of an electric motor 34 under the influence of a control unit (not shown). In addition, the arm section 22c that can pivot about the vertical axis Z of the tractor 12 is designed to be adjustable in length (adjustment option B). To this end, the arm section 22 includes two telescopically connected tubes 22d1 and 22c2 where movement of the two tubes relative to one another is accomplished through an electric spindle drive 36 under control of the control unit previously mentioned.

Lastly, an additional arm section 22d is articulated on the first arm section 22C so that it can pivot about an axis 22h perpendicular to the longitudinal direction L and to the vertical axis Z of the tractor 12, where the rotational motion of the arm section 22d takes place under the control of an electric spindle drive 38 whose output element 38a engages the first arm section 22c at point D at a predefined distance from the swivel axis 22h. The exact design of the spindle drive, or more precisely its actuating element, will be described in greater detail below.

In addition, the robot arm 22 includes two preloading mechanisms 40 and 42, which on the one hand simplifies control of the movement of the free end 22b of the robot arm particularly when the gripper device 24, or more precisely its stop device 26, is engaged with the mating stop device 30 located on the trailer 14, and on the other hand ensures stable engagement of the two stop devices 26 and 30.

The preloading device 40 is achieved through special design of the actuating unit of the actuating device 38. Specifically, a spring 38c is arranged between the actual actuating element 38b of the actuating device 38 and its output element 38a articulated on arm section 22c at D. The spring characteristic of the spring 38c is chosen in such a way that it normally represents a rigid connecting element between the actual actuating element 38b and the output section 38a despite the load of the arm section 22d itself and that of the gripper device 24 and the tractor coupling half 16 held thereby; however, when the stop device 26 with the stop face 30b engages the mating stop device 30, the spring can be compressed by further extension of the actual actuating element 38b of the actuating drive 38, thus preloading the gripper device 24 and its stop device 26 against the stop face 30b.

Thus, even if the actuating motion of the robot arm 22 against the stop face 30b is not precisely controlled, the cushioning action of the spring 38c precludes the danger of damaging the robot arm 22. On the contrary, a certain compression of the spring 38c is even desired so that the advancing motion of the tractor coupling half 16 along the coupling axis K toward the trailer coupling half 18 need not be so precisely controlled due to the preloading of the spring 38. Of course, a spring arrangement consisting of several springs can also be provided instead of the single spring 38c shown in FIG. 7 in order to achieve the desired spring characteristic or the desired travel.

To make it possible to also preload the arm section 22d or the gripper device 24 located therein, or expressed more precisely its stop device 26, against the stop face 30a of the trailer stop device 30, the arm section 22d is articulated to the arm section 22c so that, in addition to pivoting about the axis 22h, it can also pivot about an axis E running parallel to the vertical axis Z of the tractor 12, and, again, a preloading spring 42a is associated with this latter pivot option. The spring 42a preloads the arm section 22d in a position in which it extends in a straight line from arm section 22c when seen in top view as in FIG. 8. As can be seen in FIGS. 7 and 8, the arm section 22d is not attached directly to the arm section 22c, but rather to a part 44 which is connected thereto and is capable of pivoting relative to it about the axis E. Attached laterally to this intermediate part 44 is a section of chain 46; the preloading spring 42a engages at the free end hereof. The other end of the spring 42a is attached to the inner telescoping tube 22c1 of the arm section 22c. When the arm section 22d, and thus also the intermediate part 44, is pivoted clockwise about the axis "E" starting from the "straight-line" position of FIG. 8, the spring 42a is placed in tension and attempts to return the arm section 22d to the straight-line position in which the intermediate part 44 comes in contact with a stop 48 of the inner telescoping tube 22c1 of the arm section 22c.

If the gripper device 24 or its stop device 26 successfully engages with the trailer stop face 30 through pivoting of the robot arm 22 about the vertical axis Z under the influence of the actuating drive 30a, and if the actuating drive 34 is not immediately shut off, there results a pivoting of the arm section 22d about the axis E relative to the arm section 22c while placing the spring 42a in tension. Thus the spring 42a also provides a certain cushioning action which first of all protects the robot arm 22 against damage resulting from imprecise control and second of all simplifies control of the advancing movement of the gripper device 24 and the tractor coupling half 16 along the coupling axis K toward the trailer coupling half 18, as described in detail above for the spring 38c.

In conclusion, the design and arrangement of the gripper device 24 shall now be described in detail with the aid of FIG. 9. Arranged at the free end 22b of the robot arm 22 is a plate 50 which is connected by an angled rod 52 to the second arm section 22d (see FIG. 8). The plate 50 has a hole 50a through which a pin 54 passes with clearance. The head 54b of pin 54 is prevented from passing through the hole 50a by the washer 54a. In addition the pin 54 is fastened to a base part 24a of the gripper device 24. Because of the clearance between the pin 54 passing through the hole 50a and the plate 50, the base part 24a, and thus the entire gripper device 24, can be swivelled relative to the plate 50a and thus to the robot arm 22, in any desired spatial direction within certain limits. A spiral coil spring 56 arranged between the plate 50 and base part 24a preloads the base part 24a of the gripper device 24 in a predefined neutral position.

Figure 10:
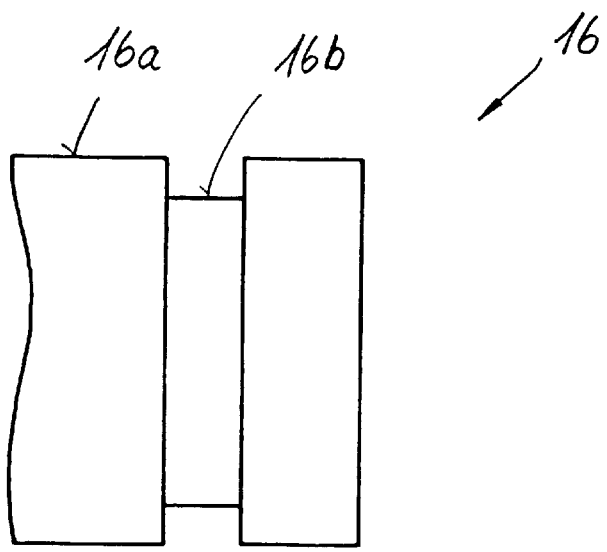
FIG. 10 is a schematic illustration for the purpose of explaining a detail of the first coupling half.

Provided in the base part 24a is a receptacle 24b for the tractor coupling half 16 whose contours essentially correspond to the outline 16a (see FIG. 10) of the tractor coupling half 16. Moreover, a gripper claw 24c is articulated to the base part 24a of the gripper device 24 at 24d, and can be adjusted between a release position (not shown) and the retaining position shown in FIG. 9 by means of an actuating drive 58. In the retaining position according to FIG. 9, the gripper claw 24c engages a recess 16b in the tractor coupling half 16 and thus prevents the coupling half 16 from slipping out of the receptacle 24b in a direction perpendicular to the plane of the drawing in FIG. 9. The tractor coupling half 16 in FIG. 9 is prevented from slipping downward out of the receptacle 24b by the legs 24e of the base part 24a of the gripper device 24, which are sized such that the receptacle 24b extends over a circumferential angle of significantly more than 180°. When the gripper claw 24c is in the retaining position shown in FIG. 9, the tractor coupling half 16 is securely held in the gripper device 24. Additionally shown in FIG. 9 is the frame 26b of the tractor stop device 26, which is attached to the base part 24a of the gripper device 24. Also visible in FIG. 9 are some of the rollers 26a of the tractor stop device 26, which are mounted on the frame 26b so as to rotate.

What is claimed is:

1. A tractor-trailer comprising:

first and second component vehicles, a trailer coupling forming an articulated push/pull connection between the first and second component vehicles;

a supply coupling between the first and second component vehicles having a first coupling half and a second coupling half that are adapted to be coupled together by bringing the coupling halves together along a predefined coupling axis, the first coupling half being connected to a supply unit of the first component vehicle through a flexible supply line and, when coupled to the second coupling half, being movable relative to the first component vehicle in such a way that relative motions of the first and second component vehicles are essentially unhindered;

an actuator arranged on the first component vehicle that moves the first coupling half toward the second coupling half and joins the coupling halves one to the other along the predefined coupling axis, the first coupling half being arranged on the actuator such that it can be oriented in all spatial directions within predetermined limits; and first securing means for making it more difficult to remove the first coupling half from the coupling axis in at least one direction after said coupling half has been positioned on the coupling axis.

2. The tractor-trailer according to claim 1, wherein positioning and orientation aids are affixed to the second component vehicle which facilitate positioning of the first coupling half on the coupling axis and also facilitate orientation of the first coupling half toward the second coupling half.

3. The tractor-trailer according to claim 2, wherein the positioning and orientation aids include two stop faces running at right angles to the predefined coupling axis and to one another and mating stops which work together with the stop faces and are provided on the first coupling half or on a part which can be attached thereto.

4. The tractor-trailer according to claim 3, wherein the stop faces include the mutually perpendicular surfaces of an angle profile.

5. The tractor-trailer according to claim 1, wherein the first securing means comprises a retaining surface of the angle profile.

6. The tractor-trailer according to claim 5, wherein the first securing means take the form of a first sheet metal strip which originates at one of the profile sections of the angle profile and extends essentially parallel to the other profile section of the angle profile.

7. The tractor-trailer according to claim 6, wherein additional securing means are provided in an approach area directly in front of the second coupling half which permit the first coupling half to move only in the direction of the coupling axis by acting in conjunction with the first securing means.

8. The tractor-trailer according to claim 7, wherein the additional securing means is a second sheet metal strip which originates at the other profile section of the angle profile and is a metal angle whose free side extends toward the first sheet metal strip.

9. The tractor-trailer according to claim 8, wherein a guide angle is formed or located on the end of the second sheet metal strip furthest from the second coupling half.

10. The tractor-trailer according to claim 1, wherein the actuator comprises a robot arm articulated from the first component vehicle and having at least two arm sections that can rotate relative to one another, and wherein the first coupling half is receivable on the free end of the robot arm.

11. The tractor-trailer according to claim 10, wherein the robot arm is attached to the first component vehicle such that it can rotate about a rotation axis parallel the vehicle's vertical axis, and means are provided for rotating the robot arm about the rotation axis.

12. The tractor-trailer according to claim 10, wherein the at least two arm sections of the robot arm can rotate relative to one another about an arm articulation axis running essentially perpendicular to the vertical axis of the first component vehicle, and means are provided for rotating one arm section relative to another arm section about the arm articulation axis.

13. The tractor-trailer according to claim 10, wherein the robot arm has at least one adjustable-length arm section adjustable in a direction of extension that is essentially perpendicular to the vertical axis of the first component vehicle as well as to the articulation axis of relative rotation of the at least two arm sections, and means is provided for changing the length of the at least one adjustable-length arm section.

14. The tractor-trailer according to claim 10, wherein the robot arm includes at least one preloading device which preloads the free end of the robot arm in the two directions perpendicular to the coupling axis and toward two stop faces.

15. The tractor-trailer according to claim 14, wherein the robot arm has two arm sections joined by a first swivel joint whose swivel axis runs perpendicular to the vertical axis of the first component vehicle and a second swivel joint having a first pivoting part that is preloaded against a stop on a second pivoting part.

16. The tractor-trailer according to claim 15, further comprising at least one actuating drive including a drive unit and a spring arrangement between a driven element connected to the drive unit and an output element that is adjustable relative to the driven element.

17. The tractor-trailer according to claim 10, wherein a gripper device is arranged at the free end of the robot arm and is adapted to be oriented in all spatial directions at least within predefined limits, and by means of which the first coupling half can be detachably arranged on the robot arm.

18. The tractor-trailer according to claim 17, wherein the gripper device includes a receptacle for the first coupling half as well as an adjustable gripper claw that can be brought into engagement with a gripping recess in the first coupling half in order to hold the first coupling half.

19. The tractor-trailer according to claim 18, wherein a positioning and orientation aid is affixed to the second component vehicle which facilitates positioning of the first coupling half on the coupling axis and also facilitates orientation of the first coupling half toward the second coupling half, and a mating stop device is provided on the gripper device that is adapted to coact with a stop device of the positioning and orientation aid.

20. The tractor-trailer according to claim 19, wherein the mating stop device includes a frame with at least three stop points and a plurality of rollers mounted on the frame such that they can rotate.

21. The tractor-trailer according to claim 17, wherein a pin is fastened to the gripper device that passes with clearance through an opening provided in the free end of the robot arm, wherein the pin is surrounded by a helical and/or coil spring that bears against the gripper device on one end and the robot arm on the other.

22. The tractor-trailer according to claim 1, wherein a parking device is provided on the first component vehicle for the actuator and the first coupling half.

23. The tractor-trailer according to claim 1, wherein the second coupling half is rigidly mounted on the associated second component vehicle.

24. The tractor-trailer according to claim 2, wherein the first component vehicle is a tractor, the second component vehicle is a trailer, the actuator is provided on the tractor, the positioning and orientation aids are affixed to the trailer, the second coupling half is arranged on the trailer, and the first coupling half is connected to the supply unit of the tractor through a flexible supply line.

25. The tractor-trailer according to claim 1, wherein the actuator includes a gripper device for the first coupling half, and a control unit is provided to control the movement of the actuator and the gripper device.

26. The tractor-trailer according to claim 25, wherein a plurality of sensors are provided to measure the instantaneous position of the actuator and the gripper device and to generate and supply sensor signals to the control unit.

27. A tractor-trailer comprising:
first and second component vehicles,
a trailer coupling forming an articulated push/pull connection between the first and second component vehicles;
a supply coupling between the first and second component vehicles having a first coupling half and a second coupling half that are adapted to be coupled together by bringing the coupling halves together along a predefined coupling axis, the first coupling half being connected to a supply unit of the first component vehicle through a flexible supply line and, when coupled to the second coupling half, being movable relative to the first component vehicle in such a way that relative motions of the first and second component vehicles are essentially unhindered; and
an actuator arranged on the first component vehicle that moves the first coupling half toward the second coupling half and joins the coupling halves one to the other along the predefined coupling axis, the first coupling half being arranged on the actuator such that it can be oriented in all spatial directions within predetermined limits, the actuator comprising a robot arm articulated from the first component vehicle and having at least two arm sections that can rotate relative to one another, the first coupling half being receivable on the free end of the robot arm.

28. The tractor-trailer according to claim 27, wherein positioning and orientation aids are affixed to the second component vehicle which facilitate positioning of the first coupling half on the coupling axis and also facilitate orientation of the first coupling half toward the second coupling half.

29. The tractor-trailer according to claim 28, wherein the positioning and orientation aids include two stop faces running at right angles to the predefined coupling axis and to one another and mating stops which work together with the stop faces and are provided on the first coupling half or on a part which can be attached thereto.

30. The tractor-trailer according to claim 29, wherein the stop faces include the mutually perpendicular surfaces of an angle profile.

31. The tractor-trailer according to claim 30, wherein first securing means in the form of a retaining surface of the angle profile are provided which make it more difficult to remove the first coupling half from the coupling axis in at least one direction after said coupling half has been positioned on the coupling axis.

32. The tractor-trailer according to claim 31, wherein the first securing means take the form of a first sheet metal strip which originates at one of the profile sections of the angle profile and extends essentially parallel to the other profile section of the angle profile.

33. The tractor-trailer according to claim 32, wherein additional securing means are provided in an approach area directly in front of the second coupling half which permit the first coupling half to move only in the direction of the coupling axis by acting in conjunction with the first securing means.

34. The tractor-trailer according to claim 33, wherein the additional securing means is a second sheet metal strip which originates at the other profile section of the angle profile and is a metal angle whose free side extends toward the first sheet metal strip.

35. The tractor-trailer according to claim 34, wherein a guide angle is formed or located on the end of the second sheet metal strip furthest from the second coupling half.

36. The tractor-trailer according to claim 27, wherein the robot arm is attached to the first component vehicle such that it can rotate about a rotation axis parallel the vehicle's vertical axis, and means are provided for rotating the robot arm about the rotation axis.

37. The tractor-trailer according to claim 27, wherein the at least two arm sections of the robot arm can rotate relative to one another about an arm articulation axis running essentially perpendicular to the vertical axis of the first component vehicle, and means are provided for rotating one arm section relative to another arm section about the arm articulation axis.

38. The tractor-trailer according to claim 27, wherein the robot arm has at least one adjustable-length arm section adjustable in a direction of extension that is essentially perpendicular to the vertical axis of the first component vehicle as well as to the articulation axis of relative rotation of the at least two arm sections, and means is provided for changing the length of the at least one adjustable-length arm section.

39. The tractor-trailer according to claim 27, wherein the robot arm includes at least one preloading device which preloads the free end of the robot arm in the two directions perpendicular to the coupling axis and toward two stop faces.

40. The tractor-trailer according to claim 39, wherein the robot arm has two arm sections joined by a first swivel joint whose swivel axis runs perpendicular to the vertical axis of the first component vehicle and a second swivel joint having a first pivoting part that is preloaded against a stop on a second pivoting part.

41. The tractor-trailer according to claim 40, further comprising at least one actuating drive including a drive unit and a spring arrangement between a driven element connected to the drive unit and an output element that is adjustable relative to the driven element.

42. The tractor-trailer according to claim 27, wherein a gripper device is arranged at the free end of the robot arm and is adapted to be oriented in all spatial directions at least within predefined limits, and by means of which the first coupling half can be detachably arranged on the robot arm.

43. The tractor-trailer according to claim 42, wherein the gripper device includes a receptacle for the first coupling half as well as an adjustable gripper claw that can be brought into engagement with a gripping recess in the first coupling half in order to hold the first coupling half.

44. The tractor-trailer according to claim 43, wherein a positioning and orientation aid is affixed to the second component vehicle which facilitates positioning of the first coupling half on the coupling axis and also facilitates orientation of the first coupling half toward the second coupling half, and a mating stop device is provided on the gripper device that is adapted to coact with a stop device of the positioning and orientation aid.

45. The tractor-trailer according to claim 44, wherein the mating stop device includes a frame with at least three stop points and a plurality of rollers mounted on the frame such that they can rotate.

46. The tractor-trailer according to claim 42, wherein a pin is fastened to the gripper device that passes with clearance through an opening provided in the free end of the robot arm, wherein the pin is surrounded by a helical and/or coil spring that bears against the gripper device on one end and the robot arm on the other.

47. The tractor-trailer according to claim 27, wherein a parking device is provided on the first component vehicle for the actuator and the first coupling half.

48. The tractor-trailer according to claim 27, wherein the second coupling half is rigidly mounted on the associated second component vehicle.

49. The tractor-trailer according to claim 28, wherein the first component vehicle is a tractor, the second component vehicle is a trailer, the actuator is provided on the tractor, the positioning and orientation aids are provided on the trailer, the second coupling half is arranged on the trailer, and the first coupling half is connected to the supply unit of the tractor through a flexible supply line.

50. The tractor-trailer according to claim 27, wherein the actuator includes a gripper device for the first coupling half, and a control unit is provided to control the movement of the actuator and the gripper device.

51. The tractor-trailer according to claim 50, wherein a plurality of sensors are provided to measure the instantaneous position of the actuator and the gripper device and to generate and supply sensor signals to the control unit.

52. A tractor-trailer comprising:

first and second component vehicles, a trailer coupling forming an articulated push/pull connection between the first and second component vehicles;

a supply coupling between the first and second component vehicles having a first coupling half and a second coupling half that are adapted to be coupled together by bringing the coupling halves together along a predefined coupling axis, the first coupling half being connected to a supply unit of the first component vehicle through a flexible supply line and, when coupled to the second coupling half, being movable relative to the first component vehicle in such a way that relative motions of the first and second component vehicles are essentially unhindered;

an actuator arranged on the first component vehicle that moves the first coupling half toward the second coupling half and joins the coupling halves one to the other along the predefined coupling axis, the first coupling half being arranged on the actuator such that it can be oriented in all spatial directions within predetermined limits; and a parking device being provided on the first component vehicle for the actuator and the first coupling half.

53. A tractor-trailer comprising:

first and second component vehicles, a trailer coupling forming an articulated push/pull connection between the first and second component vehicles;

a supply coupling between the first and second component vehicles having a first coupling half and a second coupling half that are adapted to be coupled together by bringing the coupling halves together along a predefined coupling axis, the first coupling half being connected to a supply unit of the first component vehicle through a flexible supply line and, when coupled to the second coupling half, being movable relative to the first component vehicle in such a way that relative motions of the first and second component vehicles are essentially unhindered;

an actuator arranged on the first component vehicle that moves the first coupling half toward the second coupling half and joins the coupling halves one to the other along the predefined coupling axis, the first coupling half being arranged on the actuator such that it can be oriented in all spatial directions within predetermined limits;

a gripper device for the first coupling half; and a control unit provided to control the movement of the actuator and the gripper device.

54. The tractor-trailer according to claim 53, wherein a plurality of sensors are provided to measure the instantaneous position of the actuator and the gripper device and to generate and supply sensor signals to the control unit.

* * * * *